United States Patent
Oveis Gharan et al.

(10) Patent No.: US 11,336,367 B1
(45) Date of Patent: May 17, 2022

(54) LOW-POWER PRE-COMPENSATION OF LINEAR AND NONLINEAR TRANSMITTER EFFECTS IN NARROW-SPECTRUM OPTICAL SIGNALS

(71) Applicants: Shahab Oveis Gharan, Ottawa (CA); James St. Leger Harley, Richmond (CA); Kendal Zimmer, Ottawa (CA); Christian Bourget, Stittsville (CA)

(72) Inventors: Shahab Oveis Gharan, Ottawa (CA); James St. Leger Harley, Richmond (CA); Kendal Zimmer, Ottawa (CA); Christian Bourget, Stittsville (CA)

(73) Assignee: IENA CORPORATION, Hanover, MD (US)

( * ) Notice: Subject to any disclaimer, the term of this patent is extended or adjusted under 35 U.S.C. 154(b) by 0 days.

(21) Appl. No.: 17/460,437

(22) Filed: Aug. 30, 2021

Related U.S. Application Data

(60) Provisional application No. 63/160,073, filed on Mar. 12, 2021.

(51) Int. Cl.
*H04B 10/075* (2013.01)
*H04B 10/2507* (2013.01)

(52) U.S. Cl.
CPC ....... *H04B 10/075* (2013.01); *H04B 10/2507* (2013.01)

(58) Field of Classification Search
CPC .......................... H04B 10/075; H04B 10/2507
See application file for complete search history.

(56) References Cited

U.S. PATENT DOCUMENTS

| | | | | |
|---|---|---|---|---|
| 6,747,696 B1* | 6/2004 | Nakata | ............... | H04N 5/361 |
| | | | | 348/254 |
| 10,103,924 B1* | 10/2018 | Tsai | ............... | H04L 27/2657 |
| 10,536,302 B1* | 1/2020 | Marr | ............... | H04L 25/0212 |
| 2002/0184275 A1* | 12/2002 | Dutta | ............... | H03H 17/0275 |
| | | | | 708/319 |
| 2004/0189378 A1* | 9/2004 | Suzuki | ............... | H03F 3/24 |
| | | | | 330/52 |
| 2007/0041575 A1* | 2/2007 | Alves | ............... | H04M 9/082 |
| | | | | 381/71.1 |
| 2007/0218850 A1* | 9/2007 | Pan | ............... | H03D 7/18 |
| | | | | 455/189.1 |

(Continued)

*Primary Examiner* — Mina M Shalaby
(74) *Attorney, Agent, or Firm* — Integral Intellectual Property Inc.; Amy Scouten; Miriam Paton

(57) ABSTRACT

A method performed at a transmitter comprises generating a set of digital signals representing a constellation point, each dimension of the point being uniquely represented by m bits, where m∈{1, 2, 3}; applying a linear polyphase filter to a digital signal of the set, the linear polyphase filter pre-compensating for a linear transfer function of an electro-optic path of the digital signal and generating a first filtered signal having a roll-off factor α, where α is a positive real number satisfying α≤1; applying a nonlinear polyphase filter to the digital signal, in parallel to applying the linear polyphase filter to the digital signal, the nonlinear polyphase filter generating a second filtered signal representing nonlinear noise in the electro-optic path; calculating a pre-compensated digital signal from a difference between the first and second filtered signals; and transmitting an optical signal based on the pre-compensated digital signal.

20 Claims, 11 Drawing Sheets

(56) References Cited

U.S. PATENT DOCUMENTS

| | | | | |
|---|---|---|---|---|
| 2009/0041263 | A1* | 2/2009 | Hoshuyama | H04B 3/32 |
| | | | | 381/94.1 |
| 2009/0154717 | A1* | 6/2009 | Hoshuyama | H04R 3/02 |
| | | | | 381/66 |
| 2010/0080270 | A1* | 4/2010 | Chen | H04L 27/0008 |
| | | | | 375/219 |
| 2010/0176981 | A1* | 7/2010 | Keehr | H04B 1/109 |
| | | | | 341/155 |
| 2010/0316172 | A1* | 12/2010 | Keehr | H04B 1/109 |
| | | | | 375/346 |
| 2012/0147943 | A1* | 6/2012 | Goodman | H04L 27/01 |
| | | | | 375/232 |
| 2012/0176190 | A1* | 7/2012 | Goodman | H03M 1/1052 |
| | | | | 327/551 |
| 2012/0290525 | A1* | 11/2012 | Malik | G06N 7/005 |
| | | | | 706/52 |
| 2014/0169843 | A1* | 6/2014 | Igarashi | G03G 15/5058 |
| | | | | 399/301 |
| 2014/0194073 | A1* | 7/2014 | Wyville | H04B 1/62 |
| | | | | 455/73 |

* cited by examiner

LOW-POWER PRE-COMPENSATION OF LINEAR AND NONLINEAR TRANSMITTER EFFECTS IN NARROW-SPECTRUM OPTICAL SIGNALS

CROSS-REFERENCE

This application claims the benefit of U.S. Patent Application Ser. No. 63/160,073 filed Mar. 12, 2021, the entire contents of which are incorporated herein by reference.

TECHNICAL FIELD

This document relates to the technical field of optical communications.

BACKGROUND

In an optical communication network, an optical transmitter may transmit an optical signal over a communication channel to an optical receiver, where the signal is representative of digital information in the form of symbols or bits. The receiver may process the signal received over the communication channel to recover estimates of the symbols or bits. Various components of the optical communication network may contribute noise and distortion to signals as they are conveyed over the communication channel. Electrical and optical components of the transmitter itself may have linear and nonlinear effects on signals within the transmitter.

SUMMARY

According to a broad aspect, a transmitter apparatus comprises circuitry configured to generate a set of digital signals representative of a constellation point, each dimension of the constellation point being uniquely represented by m bits, wherein m∈{1, 2, 3}. The transmitter apparatus further comprises circuitry configured to apply a linear polyphase filter to a digital signal of the set, the linear polyphase filter configured to pre-compensate for a linear transfer function of an electro-optic path of the digital signal and to generate a first filtered signal having a roll-off factor $\alpha$, where $\alpha$ is a positive real number satisfying $\alpha \leq 1$. The transmitter apparatus further comprises circuitry configured to apply a nonlinear polyphase filter to the digital signal, in parallel to applying the linear polyphase filter to the digital signal, the nonlinear polyphase filter configured to generate a second filtered signal representative of nonlinear noise in the electro-optic path. The transmitter apparatus further comprises circuitry configured to calculate a pre-compensated digital signal from a difference between the first filtered signal and the second filtered signal. The transmitter apparatus further comprises a communication interface configured to transmit an optical signal based on the pre-compensated digital signal.

According to some examples, applying the nonlinear polyphase filter to the digital signal comprises applying a nonlinear function to a plurality of delayed versions of the digital signal associated with a respective plurality of different time indices.

According to some examples, the second filtered signal comprises a plurality of sub-streams corresponding to a respective plurality of different phases of the second filtered signal, where a selected phase of the second filtered signal is generated by selected filter coefficients of the nonlinear polyphase filter and selected time indices of the plurality of different time indices, and where the selected filter coefficients or the selected time indices or both are dependent on the selected phase.

According to some examples, applying the nonlinear function to the plurality of delayed versions of the digital signal comprises quantizing each delayed version using a memoryless quantizer.

According to some examples, quantizing each delayed version comprises selecting a single bit value based on a comparison between a magnitude of the delayed version and a threshold.

According to some examples, applying the nonlinear polyphase filter to the digital signal comprises performing only addition operations and no multiplication operations.

According to some examples, the linear polyphase filter and the nonlinear polyphase filter are configured to resample the digital signal by a factor U/D, where U and D are positive integers, and where U>D.

According to some examples, the transmitter apparatus further comprises circuitry configured to process each digital signal of the set independently by applying a different pair of linear and nonlinear polyphase filters to each respective digital signal of the set, where each different pair is configured to pre-compensate for a linear transfer function and nonlinear noise associated with a different electro-optic path.

According to some examples, the constellation point belongs to a dual-polarization (DP) quadrature phase shift keying (QPSK) constellation, a 16-level DP quadrature amplitude modulation (QAM) constellation, or a 64-level DP quadrature amplitude modulation (QAM) constellation.

According to some examples, the transmitter apparatus further comprises circuitry configured to select the constellation point based on a probabilistic shaping function.

DETAILED DESCRIPTION

Figure 1:
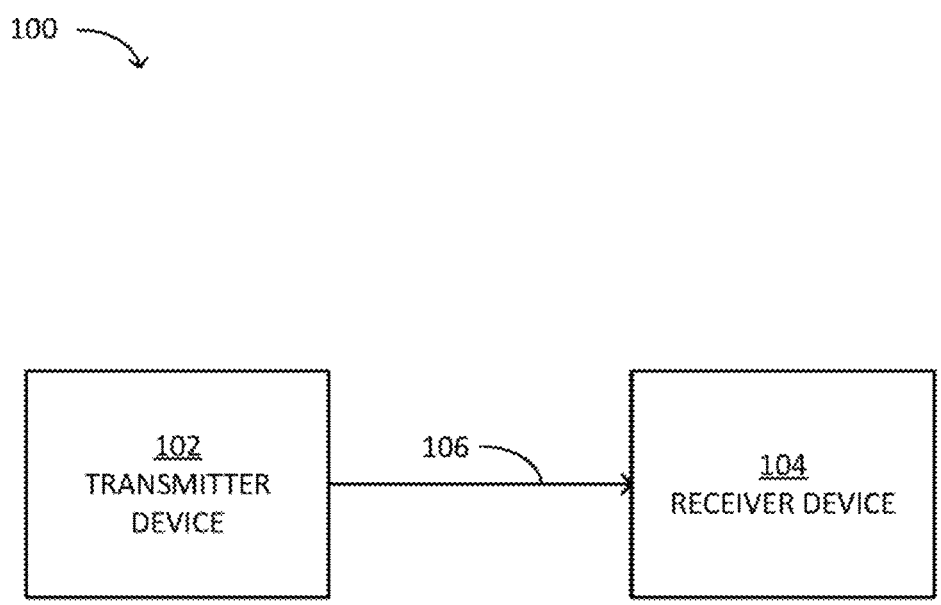
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. A stream of symbols may be transmitted at times set by a transmitter symbol clock, where the frequency of the symbol clock is referred to as the symbol frequency, or symbol rate, or baud rate, and is equivalent to $1/T_S$, where $T_S$ denotes the symbol period. At the receiver device 104, estimates of the symbols may be recovered by sampling the received signal at times set by a receiver sample clock, where the frequency of the sample clock is referred to as the sample frequency or sample rate. The sample rate may be selected to satisfy the Nyquist criterion for the highest anticipated symbol rate. For example, if the transmitter symbol rate is expected to be 10 GBaud, then the receiver sample rate may be set to 20 GHz. The decoded symbols that are recovered from the received signal may comprise noisy versions of the symbols that were originally transmitted by the transmitter device 102.

In order to reduce inter-symbol interference (ISI), the optical signal transmitted from the transmitter device 102 to the receiver device 104 may be designed to satisfy the Nyquist criterion for zero ISI. A variety of filters may be used to satisfy this criterion. One example is a raised cosine filter, which produces a bandwidth of $$\frac{1+\alpha}{T_S},$$

where α denotes a roll-off factor which is a real number satisfying 0<α≤1.

Figure 2:
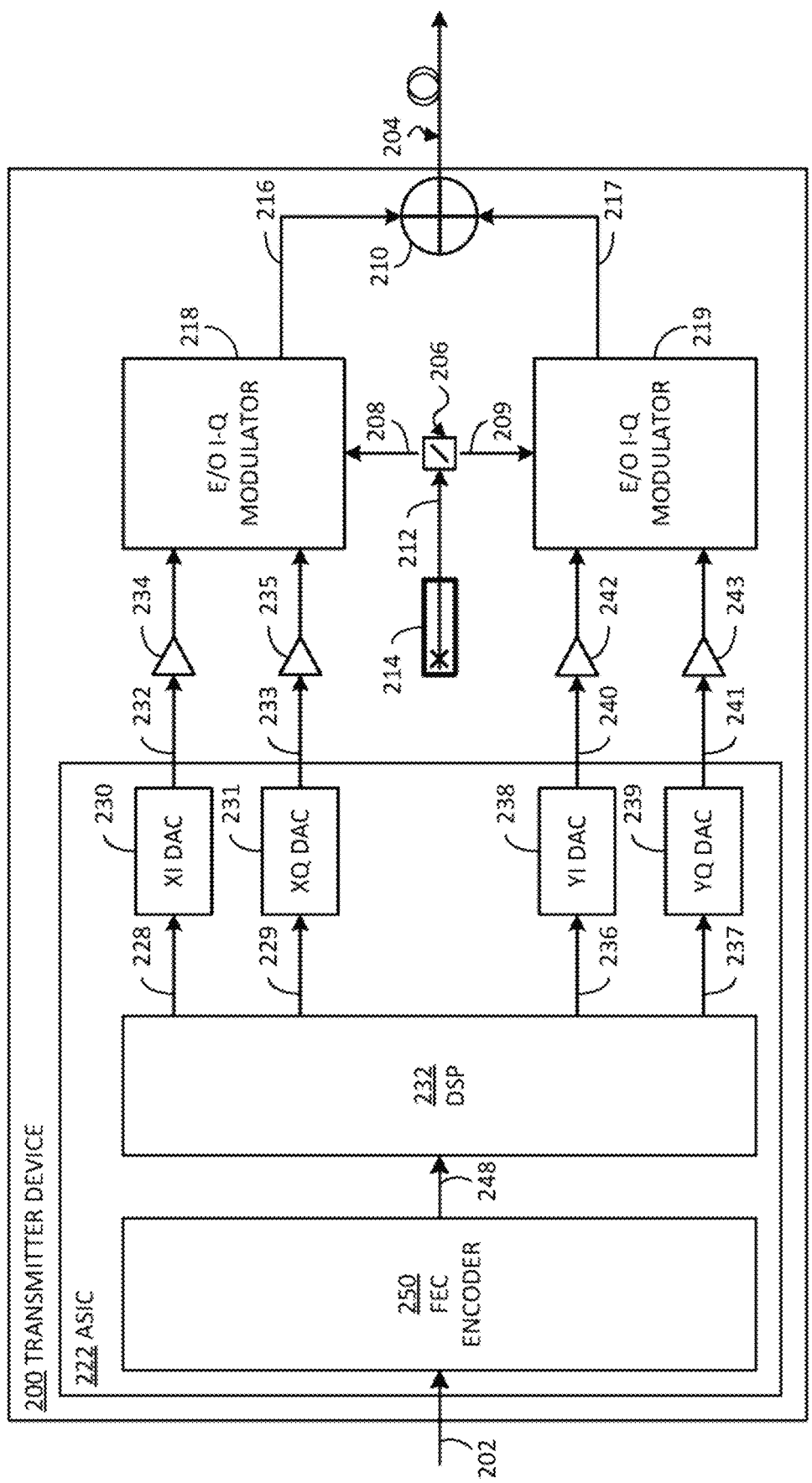
FIG. 2 illustrates an example transmitter device in accordance with some examples of the technology disclosed herein.

FIG. 2 illustrates an example transmitter device 200, in accordance with some examples of the technology disclosed herein. The transmitter device 200 is an example of the transmitter device 102. The transmitter device 200 may comprise additional components that are not described in this document.

The transmitter device 200 is configured to transmit an optical signal 204 which is representative of information bits (also referred to as client bits) 202. In this particular example, the transmitter device 200 employs polarization-division multiplexing (PDM), and the optical signal 204 is a dual-polarization (DP) signal characterized by an in-phase (I) amplitude and a quadrature (Q) amplitude in each of the X and Y polarizations. In other examples, generation of the optical signal 204 may involve one or more alternative techniques, such as single polarization modulation, modulation of an unpolarized carrier, mode-division multiplexing, spatial-division multiplexing, Stokes-space modulation, polarization balanced modulation, and the like. A laser 214 is configured to generate a continuous wave (CW) optical carrier 212. A polarizing beam splitter 206 is configured to split the CW optical carrier 212 into orthogonally-polarized components 208, 209 (nominally referred to as the "X-polarization" component and the "Y-polarization" component) that are modulated by respective electrical-to-optical (E/O) modulators 218, 219 to produce modulated polarized optical signals 216, 217 that are combined by a beam combiner 210, thus yielding the optical signal 204. In some examples (not shown), the polarizing beam splitter 206 and the beam combiner 210 may be replaced with simple power splitters and combiners. Together, elements such as the E/O modulators 218, 219, the laser 214, the beam splitter 206, and the beam combiner 210 may form a communication interface configured to transmit optical signals to other devices in a communication network, such as the network 100.

The transmitter device 200 may comprise an application specific integrated circuit (ASIC) 222. According to some examples, the ASIC 222 may comprise a forward error correction (FEC) encoder 250 configured to apply FEC encoding to the client bits 202 to generate FEC-encoded bits 248.

The ASIC 222 may further comprise a digital signal processor (DSP) 232 configured to apply digital signal processing to the FEC-encoded bits 248. As part of the digital signal processing, the DSP 232 may be configured to map the FEC-encoded bits 248 to symbols according to a constellation look-up table (LUT). The DSP 232 may further be configured to perform digital up-sampling of the symbols, as well as operations that are subsequently applied to the sampled waveform, either in the time domain or the frequency domain. Such operations may include pulse shaping, frequency division multiplexing (FDM), distortion pre-compensation, and CD pre-compensation. The DSP 232 may be configured process signals using one or more filters, which may involve the application of one or more Fast Fourier Transforms (FFTs) and one or more corresponding inverse FFTS (IFFTs).

The DSP 232 is configured to generate I and Q digital drive signals 228, 229 for the X-polarization to be converted by digital-to-analog converters (DACs) 230, 231, respectively, into I and Q analog drive signals 232, 233 for the X-polarization that, after amplification by respective radiofrequency (RF) driver amplifiers 234, 235, are used to drive the E/O modulator 218. The DSP 232 is configured to generate I and Q digital drive signals 236, 237 for the Y-polarization to be converted by DACs 238, 239, respectively, into I and Q analog drive signals 240, 241 for the Y-polarization that, after amplification by respective RF driver amplifiers 242, 243, are used to drive the E/O modulator 219.

Although illustrated as comprised in the ASIC 222, in an alternate implementation the DACs 230, 231, 238, 239 or portions thereof may be separate from the ASIC 222. The DACs 230, 231, 238, 239 may be controlled by a signal received from a voltage-controlled oscillator (VCO) (not shown).

The optical signal 204 may be defined by four amplitudes in four respective dimensions, where the I and Q dimensions of the X polarization are denoted XI and XQ, respectively, and where the I and Q dimensions of the Y polarization are denoted YI and YQ, respectively. Each amplitude comprises a magnitude and a sign. The amplitudes of the optical signal 204 are established by the digital drive signals 232, 233, 240, 241, which are determined based on the values of the bits 248 and the constellation LUT used by the DSP 232.

Figure 3:
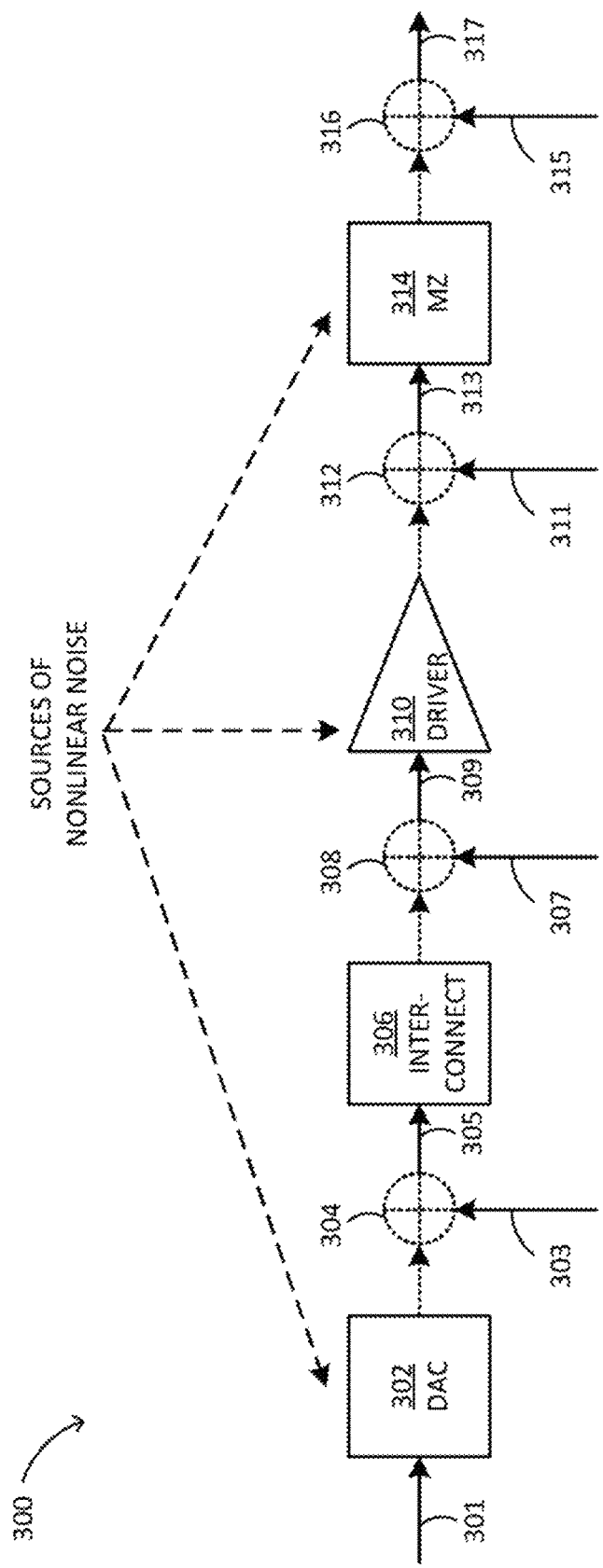
FIG. 3 illustrates potential sources of noise and distortion on an electro-optic path.

FIG. 3 illustrates potential sources of noise and distortion on an electro-optic path 300 of a transmitter device, such as the transmitter device 200.

Signal 301 is an example of one of the digital signals 228, 229, 236, 237 generated by the DSP 232. The digital signal 301 is input to a DAC 302, which outputs an analog signal 305. The DAC 302 is an example of one of the DACs 230, 231, 238, 239. The analog signal 305 comprises noise added by the DAC 302, such as integral nonlinearity, differential nonlinearity, and jitter. The addition of this noise into the signal path is represented by the combination of a DAC noise signal 303 and a summation operation 304.

Although not explicitly illustrated in FIG. 2, during transmission from the DACs 230, 231, 238, 239 to the RF driver amplifiers 234, 235, 242, 243, the analog signals 232, 233, 240, 241 may pass through a RF inter-connect which may contribute thermal noise to the signals 232, 233, 240, 241. For example, as illustrated in FIG. 3, the analog signal 305, which includes the DAC noise signal 303, is input to an inter-connect 306, which outputs a signal 309. The addition of the thermal noise from the inter-connect is represented by the combination of an inter-connect noise signal 307 and a summation operation 308.

The signal 309, which includes the DAC noise signal 303 and the inter-connect noise signal 307, is input to a RF driver amplifier 310, which outputs a signal 313. The RF driver amplifier 310 is an example of one of the RF driver amplifiers 234, 235, 242, 243. The RF driver amplifier 310 may contribute nonlinear noise to the signal path, as represented by the combination of a driver noise signal 311 and a summation operation 312.

The signal 313, which includes the DAC noise signal 303, the inter-connect noise signal 307, and the driver noise signal 311, is input to a Mach Zehnder (MZ) modulator 314, which outputs a signal 317. The MZ modulator 314 is an example of one of the E/O modulators 218, 219. The MZ modulator 314 may contribute nonlinear noise to the signal path, as represented by the MZ noise signal 315 and the summation operation 316.

The signal 317 output by the MZ modulator 314 includes nonlinear noise contributions from the DAC 302, the RF driver amplifier 310, and the MZ 314 (represented by the DAC noise signal 303, the driver noise signal 311, and the MZ noise signal 315, respectively). The signal 317 also includes a linear noise contribution from the inter-connect 306 (represented by the inter-connect noise signal 307), as well as other linear noise contributions from the various elements in the electro-optic path 300. Each of the elements in the electro-optic path, such as the DAC 302, the inter-connect 306, the RF driver amplifier 310, and the MZ modulator 314 may contribute linear distortion to the signals being processed, characterized for example, by a transfer function or impulse response. It is of interest to design the signal 301 such that it is pre-compensated for both the linear and nonlinear effects of the electro-optic path 300, thereby resulting in the optical signal 317 being a substantially noise-free, distortion-free representation of the electrical signal 301.

The next generation of low-power pluggable devices for optical communications at 60 Gbaud or higher have small form factors and low electrical power limits. According to some examples, these pluggable devices may be used for line side optics or dense wavelength division multiplexing (DWDM) and also for client side optics. One example is Quad Small Form Factor Pluggable Double Density (QSFP-DD) devices. Given the constraints on device size and electrical power, it may be a challenge for these devices to meet performance requirements of certain applications, such as transmitter output power, implementation noise, and optical spectrum.

As previously described, an optical signal that satisfies the Nyquist criterion for zero ISI may be characterized by a roll-off factor $\alpha$, where $\alpha$ is a real number satisfying $0<\alpha\leq1$. As the value of a approaches zero, the spectral width of the optical signal narrows and its shape becomes closer to a rectangle function in the frequency domain. Low values of a may be of interest for reducing the penalties from optical filters, reducing linear cross-talk between adjacent WDM signals, and increasing the number of wavelengths that are transmissible over a fiber.

Traditional methods for achieving pre-compensation of linear transmitter electro-optic effects, such as I/Q delay, low-pass response of the DACs, and RF driver amplifier response generally involve the use of FFTs and IFFTs. However, where narrow pulse shapes are used (for example, $\alpha\leq0.15$ or $\alpha\leq0.3$), the electrical power required to implement these FFT/IFFT-based pre-compensation methods may become undesirably high due to the longer impulse responses needed to achieve the narrow spectral widths. For this reason, current low-power optical devices in the industry may use relatively large values for the roll-off factor $\alpha$ (for example, $\alpha\geq0.4$), such that these devices may not benefit from the potential advantages of narrow-spectrum signals.

Moreover, because of the limited space available for achieving optical gain in these small pluggable devices, it may be necessary to drive the RF driver amplifiers harder (i.e., for higher gain) in order to achieve a target optical output power. As a result, the RF driver amplifiers may generate significant nonlinear noise which may degrade transmitter performance. Thus, there remains a need for technology capable of achieving low-power compensation of linear and nonlinear transmitter effects in narrow-spectrum optical signals.

A discrete time-domain signal x[n] can be decomposed into D streams, where D is a positive integer, and where each stream is defined as x[nD+d] for a different value $d\in\{0, 1, \ldots, D-1\}$. For example, if D=4, then the stream associated with d=0 is {x[0], x[4], x[8], ... }; the stream associated with d=1 is {x[1], x[5], x[9], ... }; the stream associated with d=2 is {x[2], x[6], x[10], ... }; and the stream associated with d=3 is {x[3], x[7], x[11], ... }. This may be referred to as a polyphase decomposition, since each decomposed stream corresponds to a decimated version of the time-domain signal x[n] associated with a different phase. Linear and nonlinear processing of time-domain signals can be efficiently performed using polyphase filtering. A polyphase filter may be understood as a plurality of sub-filters, where each sub-filter is applied, using time-domain convolution, to a different sub-stream of an input time-domain signal, and where the outputs of the plurality of sub-filters are added together, sample by sample, to generate a filtered output time-domain signal. This implementation is efficient because each sub-filter is applied to a decimated version of the input signal x[n], which requires fewer multiplications than applying each sub-filter to the entire input signal x[n]. A sample rate conversion may be performed on the input signal x[n] to ensure that there is excess bandwidth in the output signal y[n] to enable various signal processing functions, such as clock recovery. A polyphase filter may be configured to generate an output signal y[n] that is up-sampled by a factor of U/D relative to the input signal x[n], where U and D denote positive integers, and where U>D. That is, D input sub-streams, each corresponding to a different phase of x[n], may be mapped to U output sub-streams, where each output sub-stream corresponds to a different phase of y[n].

According to some examples of the technology described herein, the digital signals provided to the DACs may be processed by two parallel filter banks, where one bank (herein referred to as the linear filter bank) uses at least one first polyphase filter for narrow pulse shaping and pre-compensation of the linear transfer function of a transmitter electro-optic path, and where the other bank (herein referred to as the nonlinear filter bank) uses at least one second polyphase filter to estimate the nonlinear noise in the transmitter electro-optic path. Each of the two parallel filter banks may be configured to implement signal up-sampling by a factor of U/D. The outputs of the two parallel filter banks may be combined to generate a narrow-spectrum signal that is pre-compensated for linear and nonlinear effects of the electro-optic path. According to some examples, the two parallel filter banks may be implemented in conjunction with a modulation format in which each constellation point is represented by m bits per dimension, where $m\in\{1, 2, 3\}$. Because the input to each parallel filter bank is constrained to a small number of bits (1, 2, or 3), implementation of the first and second polyphase filters may very power-efficient relative to FFT-based filtering methods. As will be described in more detail herein, the first polyphase filter (i.e., the linear polyphase filter) may be implemented using a moderate number of additions (for example, 6 additions per DAC value) with no multiplications, even in the event that the first polyphase filter is designed to achieve a narrow pulse shape (such as $\alpha\leq0.3$) using a large number of tap coefficients (for example, 24 or more). The second polyphase filter (i.e., the nonlinear polyphase filter) may be configured to implement a simplified calculation of nonlinear noise because the triplet interactions are between signals representing small numbers of bits (1, 2, or 3). As will be shown in more detail herein, the second polyphase filter may be implemented without performing any multiplications, thereby achieving very low-power nonlinear noise estimation.

Since nonlinear noise is typically generated by higher frequencies, the narrow spectrum achieved by the linear polyphase filter may help reduce the amount of nonlinear noise contributed by the RF driver amplifiers.

Figure 4:
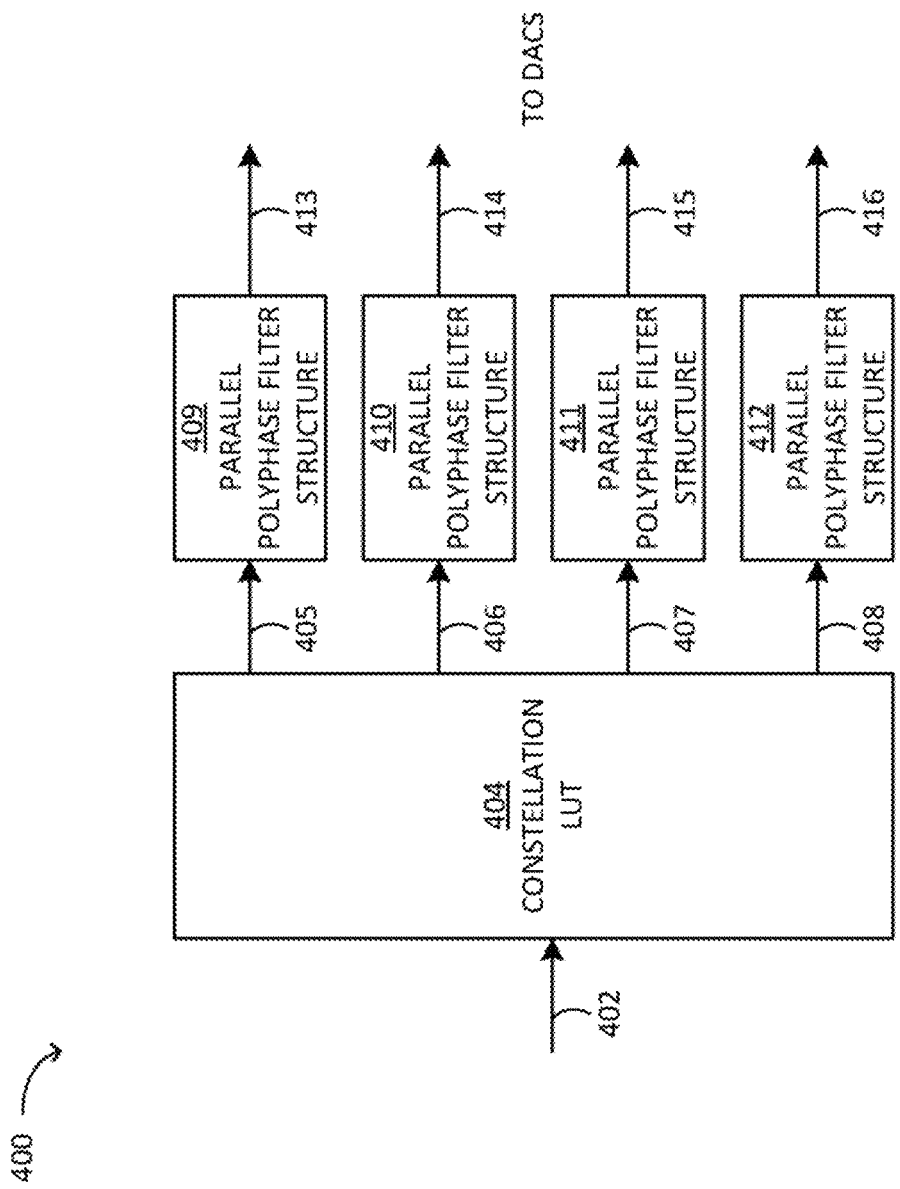
FIG. 4 illustrates a schematic of digital signal processing performed at a transmitter device in accordance with some examples of the technology disclosed herein.

FIG. 4 illustrates a schematic of example digital signal processing 400 performed at a transmitter in accordance with some examples of the proposed technology. The digital signal processing 400 is an example of the digital signal processing implemented by the DSP 232 in FIG. 2. The digital signal processing 400 generates digital signals 413, 414, 415, 416 based on bits 402, where the bits 402 are an example of the bits 202 or 248 in FIG. 2. The digital signals 413, 414, 415, 416 output by the digital signal processing 400 are examples of the digital signals 228, 229, 236, 237 in FIG. 2, corresponding to the dimensions XI, XQ, YI, and YQ, respectively. The construction of the orthogonality of the dimensions is implemented in the E/O modulators 218, 219, which form the I and Q signals within the two polarizations X and Y. The DSP 232 operates on four real independent signals (or dimensions).

Based on a mapping defined in a constellation LUT 404, the bits 402 are mapped to symbols, where each symbol corresponds to a unique point of a selected constellation. Each point of the constellation may be represented by a combination of digital signals. For example, as illustrated in FIG. 4, a given constellation point may be represented by the four digital signals 405, 406, 407, 408, which may correspond to the dimensions XI, XQ, YI, and YQ, respectively. The constellation may be selected such that each dimension of any constellation point can be represented by m bits, where $m\in\{1, 2, 3\}$. For example, any constellation point selected from a DP quadrature phase-shift keying (QPSK) constellation with evenly spaced points may be uniquely represented by 1 bit per dimension. In another example, any constellation point selected from a DP 16-level quadrature amplitude modulation (16-QAM) constellation with evenly spaced points may be uniquely represented by 2 bits per dimension. In yet another example, any constellation point selected from a DP 64-QAM constellation with evenly spaced points may be uniquely represented by 3 bits per dimension. Accordingly, depending on the selected constellation associated with the constellation LUT 404, each one of the digital signals 405, 406, 407, 408 in a given time interval may be representative of m bits, where m=1, 2, or 3.

The digital signal processing 400 comprises four parallel polyphase filter structures 409, 410, 411, 412 which are applied, respectively, to the four real digital signals 405, 406, 407, 408 generated by the constellation LUT 404, corresponding to the dimensions XI, XQ, YI, YQ, respectively. According to some examples, the pre-compensation provided by the parallel polyphase filter structures 409, 410, 411, 412 may be independently optimized per electro-optic path. For example, the parallel polyphase filter structure 409 applied to the digital signal 405 may be configured using different parameters from the parallel polyphase filter structure 410 applied to the digital signal 406 According to some examples, the proposed filtering may be applied to only a subset of the digital signals 405, 406, 407, 408.

Figure 5:
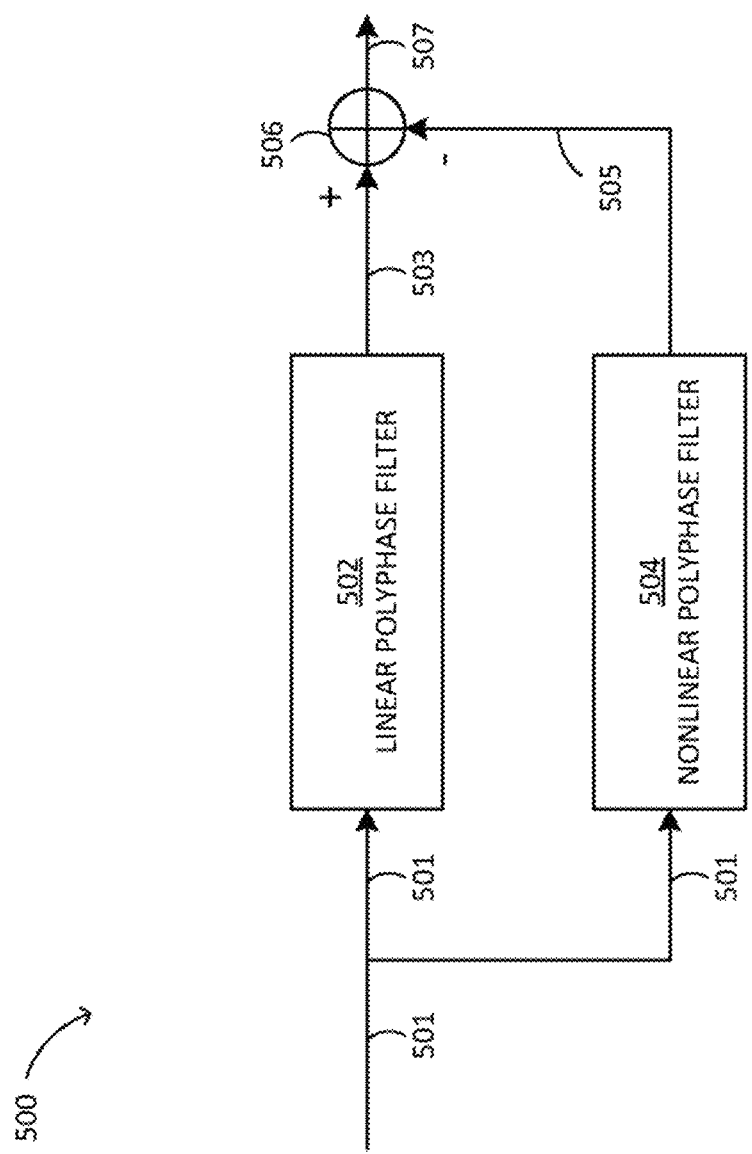
FIG. 5 illustrates a parallel polyphase filter structure in accordance with some examples of the technology disclosed herein.

FIG. 5 illustrates a parallel polyphase filter structure 500 in accordance with some examples of the proposed technology. The parallel polyphase filter structure 500 is an example of any one of the parallel polyphase filter structures 409, 410, 411, 412 in FIG. 4.

The parallel polyphase filter structure 500 comprises a first polyphase filter 502, which is implemented in parallel with a second polyphase filter 504. Each of the polyphase filters 502, 504 may comprise a finite impulse response (FIR) filter.

The first polyphase filter 502 is a linear polyphase filter, while the second polyphase filter 504 is a nonlinear polyphase filter. When applied to a digital signal 501, such as the signal 405 in FIG. 4, the linear polyphase filter 502 generates a signal 503 which may be pre-compensated for an expected linear transfer function associated with the electro-optic path of the digital signal 501. In parallel to the application of the linear polyphase filter 502 to the digital signal 501, the nonlinear polyphase filter 504 is also applied to the digital signal 501, thereby generating a signal 505 which may represent an estimate of nonlinear noise in the electro-optic path of the digital signal 501.

The parallel polyphase filter structure 500 further comprises a difference operation 506 which may be applied to the signals 503 and 505, thereby resulting in a signal 507 which is representative of a difference between the signal 503 and 505. The signal 507 corresponds to a version of the signal 501 which has been pre-compensated for expected linear and nonlinear effects in the electro-optic path. Although not explicitly illustrated in FIG. 5, a mean value of the signal 507 may be calculated and then subtracted from the signal 507, such that the DAC receives a signal having a mean value of zero.

Each one of the polyphase filters in the structure 500 may perform a resampling operation on the digital signal 501. For example, each filter may be characterized by a resampling ratio denoted by U/D, where U and D are positive integers, and where U>D. One may consider an example wherein the digital signal 501 in a given clock cycle consists of 128 samples denoted by {x[0], x[1], . . . , x[127]}, where each sample corresponds to m bits which uniquely represent a point of a selected constellation, where m∈{1, 2, 3}. In the event that each filter has a resampling ratio U/D=5/4, each of the signals 503 and 505 at the given clock cycle would consist of 128×(5/4)=160 samples, where each sample in the signals 503 and 505 represents Nb bits, where Nb denotes the resolution of the DAC, which is typically in the range of 4 to 8 bits. Under these circumstances, the digital signal 507 generated in the given clock cycle by the parallel polyphase filter structure 500 would consist of 160 samples, which might be denoted by {y[0], y[1], . . . , [159]}, each sample representing Nb bits. An example of the linear polyphase filter 502 is described in more detail with respect to FIGS. 6 and 7. An example of the nonlinear polyphase filter 504 is described in more detail with respect to FIG. 10.

As previously noted, a polyphase filter may be understood as comprising a plurality of sub-filters, where each sub-filter is applied to a different decimated stream of the input signal corresponding to a different phase of the input signal in the time domain. To better understand the processing performed by a linear polyphase filter, such as the filter 502, each sub-filter may be considered as comprising multiple short subsets. For a linear polyphase filter characterized by a resampling ratio U/D, each one of the U sub-filters comprises D short subsets. Accordingly, the polyphase filter may be characterized by U×D short subsets, which are denoted by $h_{ud}$, for an output phase value u∈{0, 1, . . . , U−1} and an input phase value d∈{0, 1, . . . , D−1}. Using the short subsets $h_{ud}$, U output streams y are generated from D input streams x according to:

$$y[Un+u] = \sum_{d=0}^{D-1} (h_{ud} * x[Dn+d]) \quad [1]$$

where n denotes clock cycle, and the operator * denotes convolution. Importantly, each sample x[Dn+d] comprises only m bits, where m∈{1, 2, 3}, so it is possible to implement Equation 1 by only performing addition operations, and without performing any multiplication operations. Accordingly, implementation of the polyphase filter in hardware is very efficient.

Figure 6:
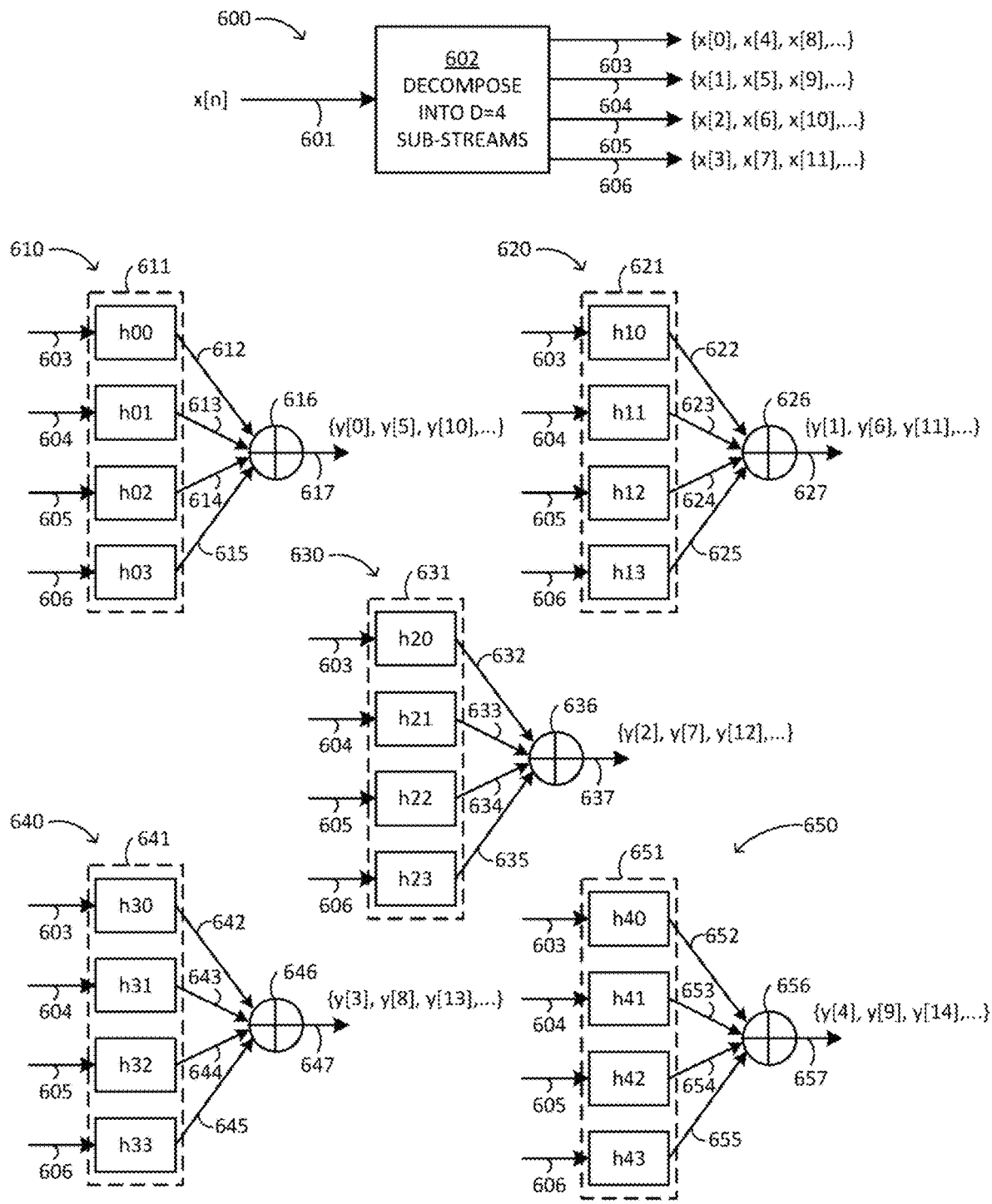
FIG. 6 illustrates schematics showing processing performed by a linear polyphase filter in accordance with some examples of the technology disclosed herein.

FIG. 6 illustrates schematics 600, 610, 620, 630, 640, 650 showing example processing performed by a linear polyphase filter, such as the filter 502 in FIG. 5. In this example, the linear polyphase filter is characterized by a resampling ratio of U/D=5/4. However, other values of U and D are possible, and other resampling ratios are possible.

In the schematic 600, an input signal 601 is decomposed by an operation 602 into D=4 decimated streams 603, 604, 605, 606. Each decimated stream may be referred to as a sub-stream of the input signal 601. Thus, for example, where the input signal 601 is denoted by x[n], for n≥0, the sub-stream 603 may be denoted by {x[0], x[4], x[8], . . . }; the sub-stream 604 may be denoted by {x[1], x[5], x[9], . . . }; the sub-stream 605 may be denoted by {x[2], x[6], x[10], . . . }; and the sub-stream 606 may be denoted by {x[3], x[7], x[11], . . . }. Thus, the sub-stream 603 represents a first input phase (d=0) of the input signal 601; the sub-stream 604 represents a second input phase (d=1) of the input signal 601; the sub-stream 605 represents a third input phase (d=2) of the input signal 601; and the sub-stream 606 represents a fourth input phase (d=3) of the input signal 601. As previously noted, each input sample x[n], for n≥0, may comprise only m bits, where m∈{1, 2, 3}.

In the schematic 610, the four sub-streams 603, 604, 605, 606 are respectively convolved with the filter subsets $h_{00}$, $h_{01}$, $h_{02}$, $h_{03}$, thereby resulting in four respective signals 612, 613, 614, 615. A summation operation 616 is applied to the signals 612, 613, 614, 615 to generate an output signal 617. The operations performed in the schematic 610 correspond to Equation 1 for the case where the output phase value is u=0, such that the output is $y[5n]=h_{00}*x[4n+0]+h_{01}*x[4n+1]+h_{02}*x[4n+2]+h_{03}*x[4n+3]$. Thus, for n=0, the output is $y[0]=h_{00}*x[0]+h_{11}*x[1]+h_{02}*x[2]+h_{03}*x[3]$; for n=1, the output is $y[5]=h_{00}*x[4]+h_{01}*x[5]+h_{02}*x[6]+h_{03}*x[7]$; for n=2, the output is $y[10]=h_{00}*x[8]+h_{01}*x[9]+h_{02}*x[10]+h_{03}*x[11]$; and so on.

In the schematic 620, the four sub-streams 603, 604, 605, 606 are respectively convolved with the filter subsets $h_{10}$, $h_{ii}$, $h_{12}$, $h_{13}$, thereby resulting in four respective signals 622, 623, 624, 625. A summation operation 626 is applied to the signals 622, 623, 624, 625 to generate an output signal 627. The operations performed in the schematic 620 correspond to Equation 1 for the case where the output phase value is u=1, such that the output is $y[5n+1]=h_{10}*x[4n+0]+h_{11}*x[4n+1]+h_{12}*x[4n+2]+h_{13}*x[4n+3]$. Thus, for n=0, the output is $y[1]=h_{10}*x[0]+h_{11}*x[1]+h_{12}*x[2]+h_{13}*x[3]$; for n=1, the output is $y[6]=h_{10}*x[4]+h_{11}*x[5]+h_{12}*x[6]+h_{13}*x[7]$; for n=2, the output is $y[11]=h_{10}*x[8]+h_{11}*x[9]+h_{12}*x[10]+h_{13}*x[11]$; and so on.

In the schematic 630, the four sub-streams 603, 604, 605, 606 are respectively convolved with the filter subsets $h_{20}$, $h_{21}$, $h_{22}$, $h_{23}$, thereby resulting in four respective signals 632, 633, 634, 635. A summation operation 636 is applied to the signals 632, 633, 634, 635 to generate an output signal 637. The operations performed in the schematic 630 correspond to Equation 1 for the case where the output phase value is u=2, such that the output is $y[5n+2]=h_{20}*x[4n+0]+h_{21}*x[4n+1]+h_{22}*x[4n+2]+h_{23}*x[4n+3]$. Thus, for n=0, the output is $y[2]=h_{20}*x[0]+h_{21}*x[1]+h_{22}*x[2]+h_{23}*x[3]$; for n=1, the output is $y[7]=h_{20}*x[4]+h_{21}*x[5]+h_{22}*x[6]+h_{23}*x[7]$; for n=2, the output is $y[12]=h_{20}*x[8]+h_{21}*x[9]+h_{22}*x[10]+h_{23}*x11$; and so on.

In the schematic 640, the four sub-streams 603, 604, 605, 606 are respectively convolved with the filter subsets $h_{30}$, $h_{31}$, $h_{32}$, $h_{33}$, thereby resulting in four respective signals 642, 643, 644, 645. A summation operation 646 is applied to the signals 642, 643, 644, 645 to generate an output signal 647. The operations performed in the schematic 640 correspond to Equation 1 for the case where the output phase value is u=3, such that the output is $y[5n+3]=h_{30}*x[4n+0]+h_{31}*x[4n+1]+h_{32}*x[4n+2]+h_{33}*x[4n+3]$. Thus, for n=0, the output is $y[3]=h_{30}*x[0]+h_{31}*x[1]+h_{32}*x[2]+h_{33}*x[3]$; for n=1, the output is $y[8]=h_{30}*x[4] h_{31}*x[5]+h_{32}*x[6]+h_{33}*x[7]$; for n=2, the output is $y[13]=h_{30}*x[8]+h_{31}*x[9]+h_{32}*x[10]+h_{33}*x11$; and so on.

Finally, in the schematic 650, the four sub-streams 603, 604, 605, 606 are respectively convolved with the filter subsets $h_{40}$, $h_{41}$, $h_{42}$, $h_{43}$, thereby resulting in four respective signals 652, 653, 654, 655. A summation operation 656 is applied to the signals 652, 653, 654, 655 to generate an output signal 657. The operations performed in the schematic 650 correspond to Equation 1 for the case where the output phase value is u=4, such that the output is $y[5n+4]=h_{40}*x[4n+0]+h_{41}*x[4n+1]+h_{42}*x[4n+2]+h_{43}*x[4n+3]$. Thus, for n=0, the output is $y[4]=h_{40}*x[0]+h_{41}*x[1]+h_{42}*x[2]+h_{43}*x[3]$; for n=1, the output is $y[9]=h_{40}*x[4]+h_{41}*x[5]+h_{42}*x[6]+h_{43}*x[7]$; for n=2, the output is $y[14]=h_{40}*x[8]+h_{41}*x[9]+h_{42}*x[10]+h_{43}*x[11]$; and so on.

The transfer functions $h_{01}$, $h_{01}$, $h_{02}$, $h_{03}$ used in the schematic 610 may be understood as small subsets of a polyphase sub-filter 611 which is used to generate a first output phase (u=0) of the output signal y[n]. The transfer functions $h_{10}$, $h_{11}$, $h_{12}$, $h_{13}$ used in the schematic 620 may be understood as small subsets of a polyphase sub-filter 621 which is used to generate a second output phase (u=1) of the output signal y[n]. The transfer functions $h_{20}$, $h_{21}$, $h_{22}$, $h_{23}$ may be understood as small subsets of a polyphase sub-filter 631 which is used to generate a third output phase (u=2) of the output signal y[n]. The transfer functions $h_{30}$, $h_{31}$, $h_{32}$, $h_{33}$ may be understood as small subsets of a polyphase sub-filter 641 which is used to generate a fourth output phase (u=3) of the output signal y[n]. The transfer functions $h_{40}$, $h_{41}$, $h_{42}$, $h_{43}$ may be understood as small subsets of a polyphase sub-filter 651 which is used to generate a fifth output phase (u=4) of the output signal y[n]. Ultimately, the output signal y[n] may be determined by combining the signals 617, 627, 637, 647, 657 representing the five output phases. For example, the DSP 232 may be configured to implement the processing in the schematics 610, 620, 630, 640, 650 using parallel circuitry, and a switch or multiplexer may be used to combine the five output phases into the single output signal y[n].

Figure 7:
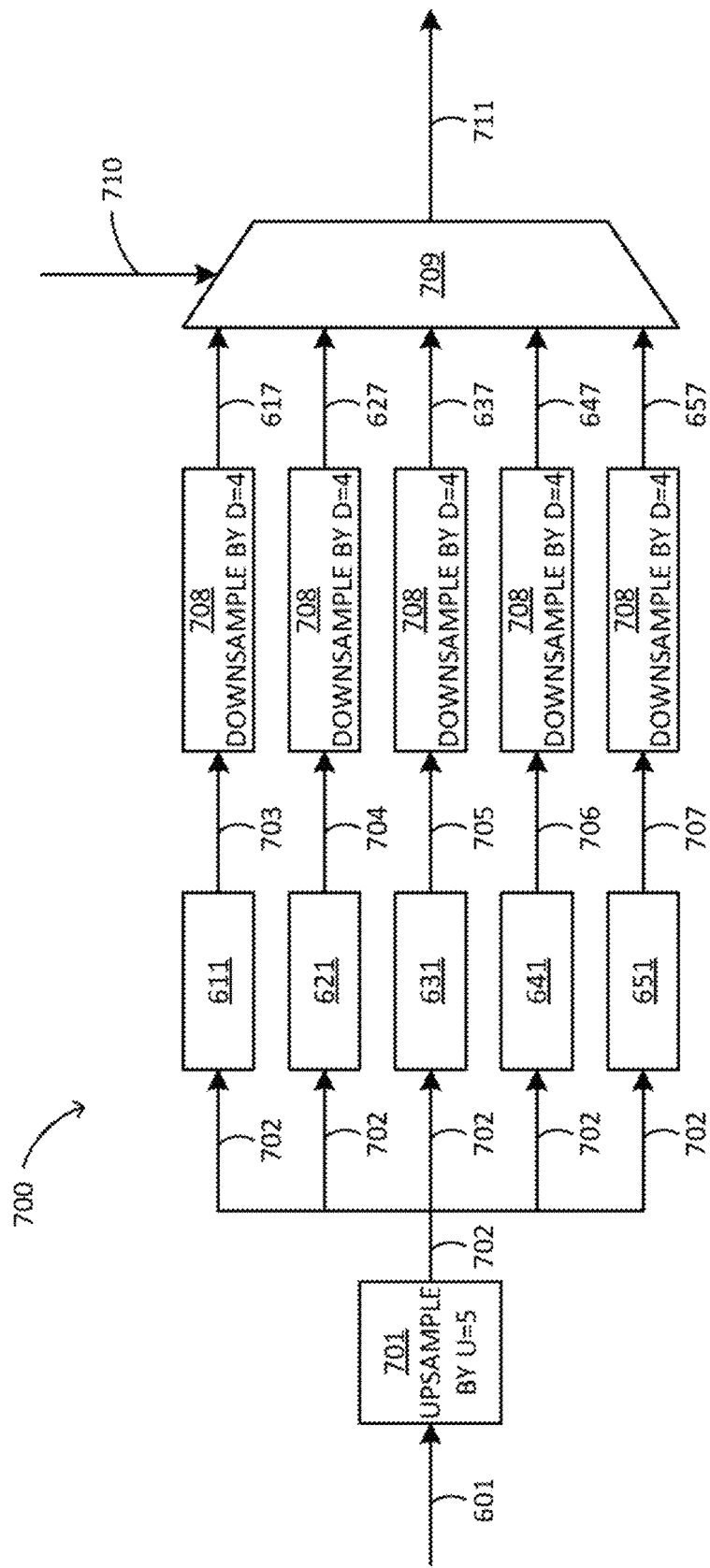
FIG. 7 illustrates a schematic showing an alternative representation of the processing in FIG. 6.

FIG. 7 illustrates a schematic 700 showing an alternative representation of the processing of FIG. 6. Instead of decomposing the input signal 601 into four sub-streams, an up-sampling operation 701 may be applied to the input signal 601 to generate an up-sampled input signal 702. Up-sampling of the input signal x[n] by a factor of U may be achieved by inserting U−1 additional "zero" samples between each sample of x[n]. For example, where m=2 bits, each "zero" sample would be equal to 00. Thus, the input signal 601 may be up-sampled by a factor of U=5 by inserting four additional "zero" samples between adjacent samples of the input signal 601, thereby generating the up-sampled signal 702. The up-sampling of a random data stream through the insertion of "zero" samples is possible because the time autocorrelation of random data is an impulse.

The up-sampled signal 702 is input, in parallel, to each one of the polyphase sub-filters 611, 621, 631, 641, 651. As described with respect to FIG. 6, the polyphase sub-filters 611, 621, 631, 641, 651 correspond, respectively, to five output phases (u=0, 1, 2, 3, 4). When applied to the up-sampled signal 702, the polyphase sub-filters 611, 621, 631, 641, 651 generate respective signals 703, 704, 705, 706, 707. It may be shown that applying a down-sampling operation 708 with a down-sampling factor of D=4 to each one of the signals 703, 704, 705, 706, 707 may generate the respective output streams 617, 627, 637, 647, 657 which, as described with respect to FIG. 6, correspond to {y[0], y[5], y[10], . . . }, {y[1], y[6], y[11], . . . }, {y[2], y[7], y[12], . . . }, {y[3], y[8], y[13], . . . }, and {y[4], y[9], y[14], . . . }, respectively. Accordingly, a multiplexer 709 (or a selector or switch) controlled by a delay parameter 710 may be configured to cycle through the output streams 617, 627, 637, 647, 657, selecting the appropriate sample from each stream to generate an output signal 711 which corresponds to {y[0], y[1], y[2], y[3], y[4], . . . }.

Each one of the polyphase sub-filters may comprise a FIR filter of order N (that is, N tap coefficients) which is designed for implementation in the up-sampled space (U=5). However, due to the presence of "zero" samples in the up-sampled signal 702, each polyphase sub-filter may be implemented using only N/5 real multiplications per sample of the input signal 601. Furthermore, given that the constellation has been selected such that each sample of the input signal 601 comprises only m bits, where m∈{1, 2, 3}, the N/5 multiplications per input sample may actually be implemented using N/5 additions per input sample. This is very power efficient relative to FFT-based filtering methods. According to some examples, each polyphase sub-filter may be designed to generate a pulse satisfying the Nyquist criterion for zero ISI, such as a root raised cosine, with a low excess bandwidth, for example, on the order of 0.05. Each polyphase sub-filter may also be designed to achieve pre-compensation of an expected linear transfer function of the electro-optic path.

Figure 8:
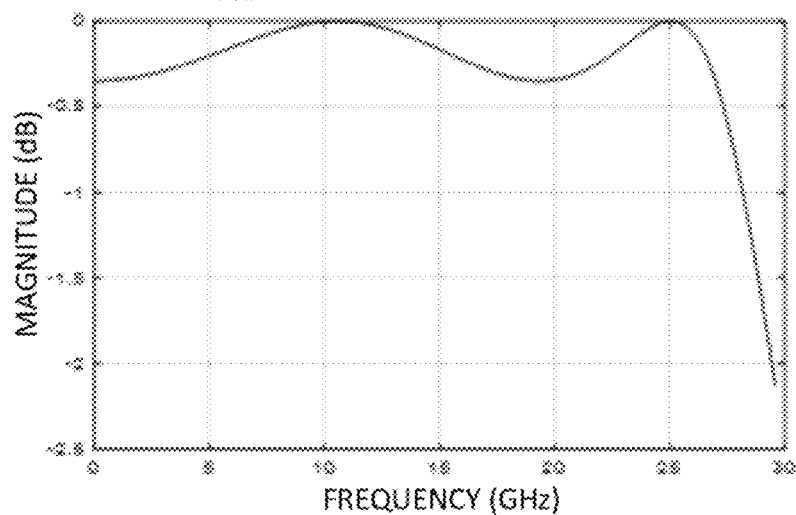
FIG. 8 illustrates a plot of a linear transfer function associated with an electro-optic path in accordance with some examples of the technology disclosed herein.

FIG. 8 illustrates a plot of an example linear transfer function associated with an electro-optic path. The magnitude of the linear response is plotted in dB relative to frequency in GHz. This transfer function represents an example of a net linear response of the electro-optic path 300 illustrated in FIG. 3.

Figure 9:
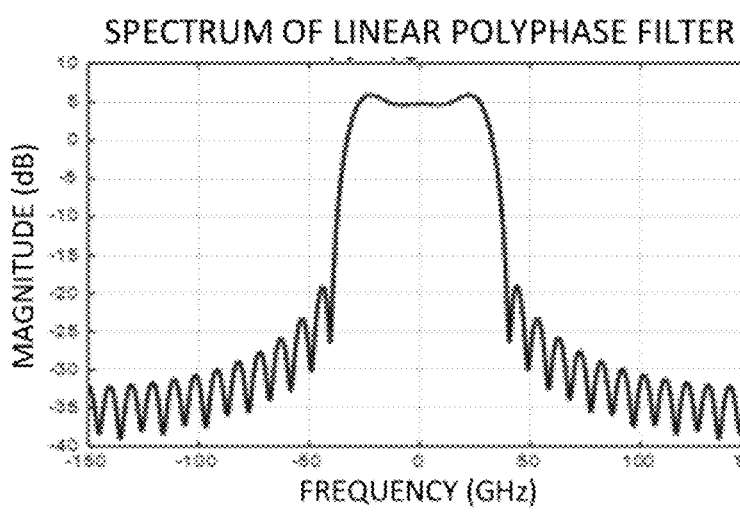
FIG. 9 illustrates a plot of a signal power spectrum of a linear polyphase filter in accordance with some examples of the technology disclosed herein.

FIG. 9 illustrates a plot of a signal power spectrum in dB of an example linear polyphase filter characterized by a roll-off factor of α=0.25, a re-sampling ratio of U/D=5/4, and N=40 tap coefficients. By up-sampling the input signal by a factor of U=5 prior to filtering, only ⅕ of the samples that undergo filtering are non-zero. Accordingly, applying the 40-tap filter involves approximately 8 multiplication operations per input sample (rather than 40). Moreover, because each sample comprises only m bits, where m∈{1, 2, 3}, each multiplication operation may instead be performed using a more efficient addition operation, which requires less power and generates less heat than a multiplication operation.

A linear polyphase filter, such as the filter having the spectrum illustrated in FIG. 9, may be used for pre-compensation of a linear transfer function, such as the function illustrated in FIG. 8. The performance achieved by the filter may vary depending on the number of coefficients used to define the filter.

Table 1 shows example SNR measurements associated with four different linear polyphase filters, where each filter is defined by a different number N of filter coefficients. SNR penalty refers to the penalty incurred by the linear polyphase filter relative to a total SNR of the transmitter and the link between the transmitter and the receiver, while SNR equivalent refers to the individual SNR associated with the linear polyphase filter. A good trade-off between performance and polyphase filter power (which is proportional to N) may be achieved with N=40.

TABLE 1

|  | N = 80 | N = 40 | N = 30 | N = 20 |
| --- | --- | --- | --- | --- |
| SNR penalty (dB) | 0.0 | 0.25 | 0.35 | 0.7 |
| SNR equivalent (dB) | >40 | 25.8 | 24 | 21.1 |

In addition to pre-compensating for linear distortion in the electro-optic path, it is also of interest to pre-compensate for nonlinear effects. In particular, there is a need for low-power circuitry which compensates for RF driver amplifier non-linearity, and is robust against all sources of nonlinearity memory, including RF driver amplifier memory, DAC memory, and interconnect memory.

Referring again to the parallel polyphase filter structure 500 illustrated in FIG. 5, the parallel application of the linear polyphase filter 502 and the nonlinear polyphase filter 504 may be advantageous for achieving low-power pre-compensation of linear and nonlinear effects in a given electro-optic path, such as the path 300. The narrow spectrum generated using the linear polyphase filter 502 may enhance the nonlinear noise compensation achieved by the combination of the nonlinear polyphase filter 504 and the difference operation 506, since nonlinear noise may be generated at higher frequencies which are removed by the linear polyphase filter 502.

Traditional techniques for nonlinear noise estimation and pre-compensation require using banks of filters for each DAC input, which may be expensive to implement. In general, a nonlinear noise estimate may be calculated as a nonlinear function of M delayed versions of an input signal, where M is a positive integer, and where each delayed version of the input signal is associated with a different time index. For example, in the case that the nonlinear noise is estimated using a triplet calculation (i.e., M=3), an output signal y[n] comprising the nonlinear noise may be calculated from an input signal x[n] according to the following equation:

$$y[n] = x[n] + \sum_{\tau_1, \tau_2, \tau_3 \geq -\Delta}^{\tau_1, \tau_2, \tau_3 \leq +\Delta} g[\tau_1, \tau_2, \tau_3] \cdot x[n-\tau_1] \cdot x[n-\tau_2] \cdot [n-\tau_3] \quad [2]$$

where $\tau_1, \tau_2, \tau_3$ denote three time indices corresponding to the three respective delayed versions of the input signal x[n], where Δ is a positive integer defining a window in time for the summation, and where g denotes a gain parameter which is dependent on the values of the three time indices $\tau_1, \tau_2, \tau_3$. According to Equation 2, each sample of the input signal x[n] requires $3(2\Delta+1)^3$ multiplication operations to calculate a sample of the output signal y[n], which may be very expensive to implement. Accordingly, this type of architecture may be unsuitable for systems with power and size limitations.

As will be described in more detail herein, estimation of nonlinear noise may be achieved more efficiently, using less power and generating less heat, by using polyphase filters. Furthermore, when nonlinear polyphase filters are used in conjunction with m-bit samples, where m∈{1, 2, 3}, the large number of multiplication operations that are traditionally required to implement the triplet calculations may be eliminated entirely, and replaced by a moderate number of addition operations.

An example is considered wherein each sample of the input signal x[n] comprises m=2 bits. That is, each sample corresponds to either the I or Q dimension of one polarization (X or Y) of a DP 16-QAM constellation. Where the points of the 16-QAM constellation consist of the 16 possible combinations of amplitudes ±1 and ±3 in two dimensions, then any given sample will be selected from the set {−3, −1, +1, +3}. Under these conditions, the following simplified technique may be used to calculate the magnitude and sign of the triplet $x[n-\tau_1] \cdot x[\tau_2] \cdot x[n-\tau_3]$ in Equation 2. A variable, herein referred to as Count, may be defined as follows:

$$\text{Count} := (|x[n-\tau_1]|==3) + (|x[n-\tau_2]|==3) + (|x[n-\tau_3]|==3) \quad [3]$$

where the operation $|x|==_3$ may be understood as: output a value of 1 if |x|=3; otherwise, output a value of 0. In effect, the magnitude of each delayed version of the input signal (in this case, $|x[n-\tau_1]|, |x[n-\tau_2]|, |x[n-\tau_2]|$) is being compared to a threshold (in this case, a value of 3), and the result of that comparison (in this case, for example, "yes, $|x[n-\tau_1]|$

|=3" or "no, $|x[n-\tau_1]| \neq 3$") is quantized to one bit value (in this case, 1 or 0). In this example, the calculation of the Count variable comprises a memoryless nonlinear quantization of the delayed versions of the input signal, followed by the application of a summation operation to the quantized delayed versions of the input signal. A memoryless quantizer may be understood as a quantizer which is applied independently to each input time-sample. Other examples are contemplated wherein the quantization is linear, and a nonlinear function is applied to the quantized delayed versions of the input signal. In general, Count may be defined as a nonlinear function of a plurality delayed versions of the input signal, where the nonlinear function comprises one-dimensional quantization of each delayed version of the input signal. According to the definition of Count in Equation 3, the maximum value is Count=3, which occurs when all three terms of the triplet have the maximum magnitude of 3. The minimum value is Count=0, which occurs when all three terms of the triplet have the minimum magnitude of 1. If only two of the three terms of the triplet have the maximum magnitude, and the other has the minimum magnitude, then Count=2. If only one of the three terms of the triplet has the maximum magnitude, and the other two have the minimum magnitude, then Count=1.

Using the value of the Count variable, determined from the three triplet terms according to Equation 3, the magnitude of the triplet may be calculated as follows:

$$|x[n-\tau_1] \cdot x[n-\tau_2] \cdot x[n-\tau_3]| := \begin{cases} 0 & \text{if Count} \in \{0, 1\} \\ 1 & \text{if Count} == 2 \\ 3 & \text{if Count} == 3 \end{cases} \quad [4]$$

In other words, in the event that the value of the Count is 0 or 1, the magnitude of the triplet is calculated to be 0; in the event that the value of the Count is 2, the magnitude of the triplet is calculated to be 2; and in the event that the value of the Count is 3, the magnitude of the triplet is calculated to be 3.

When used together with the Count definition in Equation 3, Equation 4 represents an inexpensive implementation of the multiplication of three inputs when the inputs have a low bit resolution. Other possible implementations are contemplated, for example, by mapping the Count value to different quantized values other than those specified in Equation 4 (and/or by using a different definition for the Count variable), or by simply performing low bit resolution multiplication.

The sign of the triplet $x[n-\tau_2] \cdot x[n-\tau_3]$ may be calculated as follows:

$$\text{sign}(x[n-\tau_1] \cdot x[n-\tau_2] \cdot x[n-\tau_3]) = \text{XOR}(\text{sign}(x[n-\tau_1]), \text{sign}(x[n-\tau_2]), \text{sign}(x[n-\tau_3])) \quad [5]$$

where XOR(a,b,c) denotes an exclusive OR operation applied to the terms a, b, c.

According to some examples, Equation 4 may be implemented using a fixed LUT or using logic circuits (i.e., AND/OR/XOR), while Equation 5 may be implemented using XOR logic circuits.

Using the simplified process outlined in Equations 3, 4, and 5, it is possible to calculate the value (magnitude and sign) of the triplet $x[n-\tau 1] \cdot x[n-\tau_3]$ without performing any multiplication operations, thereby offering a significant power savings over traditional triplet calculations. The power savings is made possible by exploiting the two-bit sample size to simplify the triplet calculation. The magnitude of the triplet (i.e., 0, 2, or 3) may represented by two bits, while the sign of the triplet (i.e., + or −) may be represented by one bit, such that the overall triplet value may be represented by three bits.

This technique for simplifying the triplet calculation on two-bit samples may be extended to one-bit samples and three-bit samples. In the case of three-bit samples belonging to a 64-QAM constellation, any given sample is selected from the set $\{-7, -5, -3, -1, +1, +3, +5, +7\}$. In an extension of the two-bit implementation described above, the Count variable could be used to quantify the number of "high" input samples inside the triplet, where a sample may be declared as "high" if it has a magnitude above a fixed threshold (such as three). Next, the absolute value of the triplet may be decided based on the value of Count. Other possible implementations are contemplated wherein the samples are quantized to lower bit resolution values prior to calculating the triplets, in order to reduce the cost of the circuit.

Figure 10:
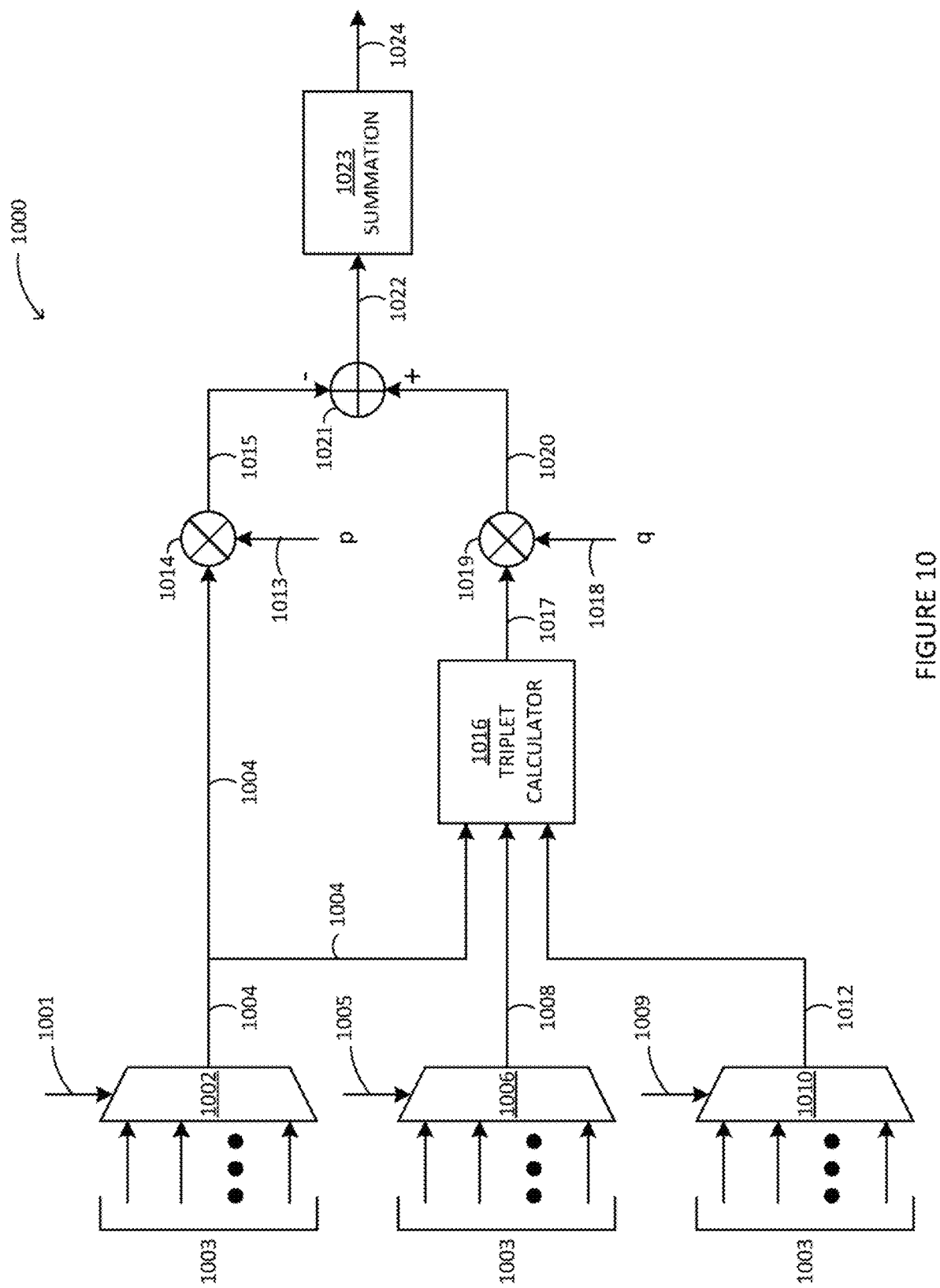
FIG. 10 illustrates a schematic showing processing performed by a nonlinear polyphase filter in accordance with some examples of the technology disclosed herein.

FIG. 10 illustrates a schematic 1000 showing example processing performed by a nonlinear polyphase filter, such as the filter 504 in FIG. 5, which is characterized by a resampling ratio of U/D, where U and D are positive integers and where U>D. The schematic 1000 illustrates the processing performed for a single output phase $u \in \{0, 1, \ldots, U-1\}$. The circuitry may be duplicated for each output phase u. For example, the schematic 1000 may be understood as a representing a sub-filter of the nonlinear polyphase filter 504.

As described with respect to FIG. 5, the input signal 501 is provided, in parallel, to both the linear polyphase filter 502 and the nonlinear polyphase filter 504. As described with respect to FIG. 6, the input signal may be decomposed into a plurality of decimated streams (also referred to as sub-streams), where each sub-stream represents a different input phase of the input signal. In the example of FIG. 10, such a plurality of sub-streams 1003 at the $n^{th}$ clock cycle may be denoted by x[Dn+d], for $d \in \{0 \ldots D-1\}$. For example, where D=4, the sub-streams 1003 at the $n^{th}$ clock cycle may be denoted by x[4n], x[4n+1], x[4n+2], x[4n+3].

The three samples used to perform the triplet calculation may be selected from the sub-streams 1003 using three respective multiplexers 1002, 1006, 1010 controlled by respective delay parameters 1001, 1005, 1009, which may be programmable in firmware. The delay parameters 1001, 1005, 1009 may be denoted by $s_1[u,k]$, $s_2[u,k]$, $s_3[u,k]$, respectively, where each delay parameter is a function of the output phase u and an index k, where k=0, 1, N, and where N denotes a total number of triplet terms over which the triplet calculation is to be performed. Based on the delay parameters 1001, 1005, 1009, the multiplexers 1002, 1006, 1010 are configured to cycle through the sub-streams 1003 to select the appropriate samples to provide, via the respective signals 1004, 1008, 1012, to a triplet calculator 1016. The triplet calculator 1016 may implement a simplified process for calculating the triplet $x[n-\tau_1] \cdot x[n-\tau_2] \cdot x[n-\tau_3]$ such that no multiplication operations are required, as described, for example, with respect to Equations 3, 4, and 5. The triplet calculator 1016 may generate a triplet signal 1017 representing the magnitude and sign of the triplet corresponding to the samples currently selected by the multiplexers 1002, 1006, 1010.

The triplet signal 1017 may be multiplied by a gain parameter 1018 using a multiplication operation 1019, thereby resulting in a signal 1020. The gain parameter 1018 may be denoted by q[u,k], and may be programmable in firmware. The purpose of filtering while using the gain parameter q[u,k] is to generate a nonlinear noise estimate that is pre-compensated for the linear effects of the electro-optic path.

The triplet calculator 1016 may cause unintended linear filtering effects in the signal 1020. For example, a nonlinear term such as $x^2[n-\tau_1] \cdot x[n-\tau_2]$ may provide a linear filter term proportional to $x[n-\tau_2]$ due to the direct current (DC) signal present in $x^2[n-\tau_1]$. These linear filtering effects may be corrected by subtracting a signal 1015 from the signal 1020 using a difference operation 1021, where the signal 1015 is generated by multiplying the signal 1004 output by the multiplexer 1002 by a gain parameter 1013 using a multiplication operation 1014. The gain parameter 1013 may be denoted by p[u, k], and may be programmable in firmware.

A summation operation 1023 over k=0, 1, N may be applied to the signals 1022 generated by the difference operation 1021, thereby resulting in a signal 1024 denoted by z, which may be expressed as:

$$z[Un+u] := \qquad\qquad\qquad\qquad\qquad\qquad [6]$$
$$\sum_{k=0}^{N} q[u,k] \cdot x[Dn+s_1(u,k)] \cdot x[Dn+s_2(u,k)] \cdot x[Dn+s_3(u,k)] +$$
$$\sum_{k=0}^{N} p[u,k] \cdot x[Dn+s_1(u,k)]$$

The signal z[Un+u] represents an estimate of the nonlinear noise expected in the electro-optic path of the input signal x at the $n^{th}$ clock cycle and the $u^{th}$ phase of the U output phases. For example, where U=5, the signal 1024 is {z[0], z[5], z[10], ... } when u=0; the signal 1024 is {z[1], z[6], z[11], ... } when u=1; the signal 1024 is {z[2], z[7], z[12], ... } when u=2; the signal 1024 is {z[3], z[8], z[13], ... } when u=3; and the signal 1024 is {z[4], z[9], z[14], ... } when u=4. As previously noted, the circuitry used to implement the schematic 1000 may be duplicated for each output phase u, for u=0, 1, ..., U−1 (where the values of q[u,k], p[u,k], s$_1$[u,k], s$_2$[u,k], s$_3$[u,k] are dependent on the value of u), thereby generating U different versions of the signal 1024, each corresponding to a different sub-stream of the nonlinear noise signal z[n]. The U sub-streams of z[n] may be combined, for example, using a switch or a multiplexer. The resulting nonlinear noise signal z[n] is an example of the signal 505 which is generated by the nonlinear polyphase filter 504.

Figure 11:
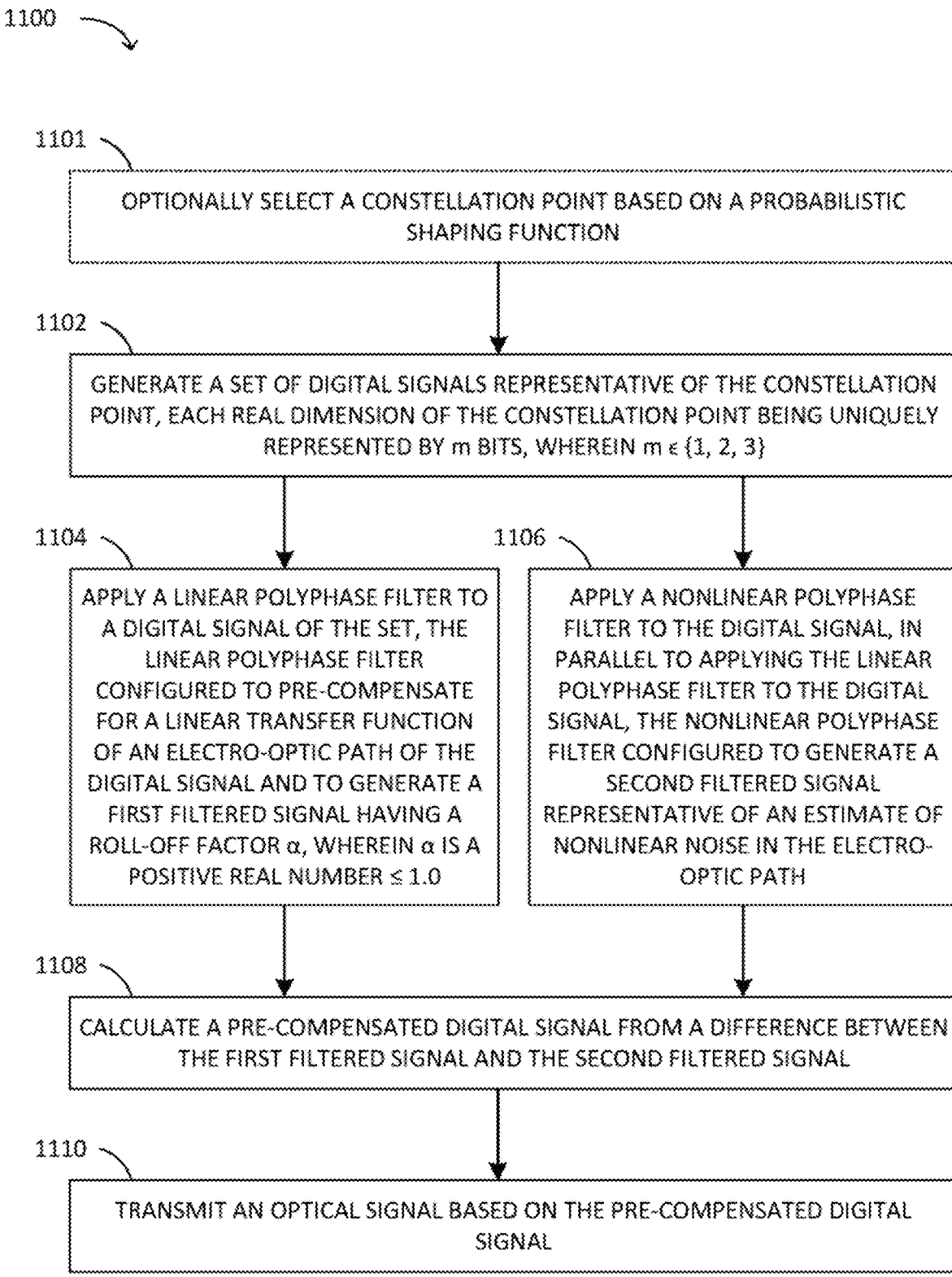
FIG. 11 illustrates a method for low-power pre-compensation of linear and nonlinear transmitter effects in narrow-spectrum optical signals in accordance with some examples of the technology disclosed herein.

FIG. 11 illustrates an example method 1100 for low-power pre-compensation of linear and nonlinear transmitter effects in narrow-spectrum optical signals. The method 1100 may be performed at a transmitter device such as the transmitter 100 or 200. For example, the method 1100 may be executed by the DSP 232 using processing represented in FIGS. 4-7 and 10.

At 1102, the transmitter generates a set of digital signals representative of a constellation point, each dimension of the constellation point being uniquely represented by m bits, wherein m∈{1, 2, 3}. For example, as described with respect to FIG. 4, the set of digital signals may comprise the signals 405, 406, 407, 408.

Optionally, as shown at 1101, the transmitter may select the constellation point based on a probabilistic shaping function. That is, the visitation probability per evenly-spaced constellation point in one dimension may be changed from a uniform probability to a different probability function that reduces the signal root mean square (RMS) for the same distance between points for some shaping gain.

At 1104, the transmitter applies a linear polyphase filter to a digital signal of the set generated at 1102. The linear polyphase filter is configured to pre-compensate for a linear transfer function of an electro-optic path of the digital signal. The linear polyphase filter is further configured to generate a first filtered signal having a roll-off factor α, where α is a positive real number satisfying α≤1. According to some examples, α≤0.3. As described with respect to FIG. 5, the digital signal may comprise, for example, the signal 501, the linear polyphase filter may comprise the linear polyphase filter 502, and the first filtered signal comprise the signal 503.

At 1106, the transmitter applies a nonlinear polyphase filter to the digital signal, in parallel to applying the linear polyphase filter to the digital signal at 1104. The nonlinear polyphase filter is configured to generate a second filtered signal representative of nonlinear noise in the electro-optic path. For example, as described with respect to FIG. 5, the nonlinear polyphase filter may comprise the nonlinear polyphase filter 504, and the second filtered signal may comprise the signal 505.

At 1108, the transmitter calculates a pre-compensated digital signal from a difference between the first filtered signal and the second filtered signal. For example, as described with respect to FIG. 5, the difference between the first filtered signal and the second filtered signal may be determined using the difference operation 506, and the pre-compensated digital signal may comprise the signal 507.

At 1110, the transmitter transmits an optical signal based on the pre-compensated digital signal. For example, as described with respect to FIG. 4, the pre-compensated digital signal may comprise any one of the signals 413, 414, 415, 416 generated during the digital signal processing performed by the DSP. As described with respect to FIG. 3, the digital signals 228, 229, 236, 237 output by the DSP 232 are converted by the DACs 230, 231, 238, 239 into respective analog signals 232, 233, 240, 241, which are then amplified by the RF driver amplifiers 234, 235, 242, 243, respectively. The amplified analog signals are used to drive the E/O modulators 218, 219, which ultimately results in the transmission of the optical signal 204.

According to some examples, applying the nonlinear polyphase filter to the digital signal at 1106 may comprise applying a nonlinear function to a plurality of delayed versions of the digital signal associated with a respective plurality of different time indices. For example, in the case where the nonlinear polyphase filter is configured to implement a triplet calculation, three delayed versions $x[n-\tau_1]$, $x[n-\tau_2]$, $x[n-\tau_3]$ of the input signal x[n], associated with the respective time indices $\tau_1, \tau_2, \tau_3$, may undergo a nonlinear function as represented, for example, by Equation 6.

According to some examples, the second filtered signal generated at 1106 may comprise a plurality of sub-streams corresponding to a respective plurality of different phases of the second filtered signal. A selected phase of the second filtered signal may be generated by selected filter coefficients of the nonlinear polyphase filter and selected time indices of the plurality of different time indices, where the selected filter coefficients or the selected time indices or both are dependent on the selected phase. For example, as shown in Equation 6, the nonlinear noise signal z associated with a given output phase u is a function of q[u,k], p[u,k], s$_1$[u,k], s$_2$[u,k], s$_3$[u,k], where the filter coefficients q[u,k], p[u,k] are dependent on the output phase u, and where the delay parameters $s_1[u,k]$, $s_1[u,k]$, $s_1[u,k]$ are also dependent on the output phase u.

According to some examples, applying the nonlinear function to the plurality of delayed versions of the digital signal may comprise quantizing each delayed version in a single dimension. According to some examples, quantizing each delayed version comprises selecting a single bit value based on a comparison between a magnitude of the delayed version and a threshold. For example, as shown in Equation 3, quantization of the delayed version $x[n-\tau_1]$ comprises comparing $|x[n-\tau_1]|$ to a threshold of 3, and selecting a bit value of 1 or 0 based on the comparison.

According to some examples, application of the nonlinear polyphase filter may comprise performing only addition operations and may exclude any multiplication operations. The ability to generate an estimate of nonlinear noise without performing multiplication operations may be particularly advantageous in terms of power savings and reduced hardware complexity.

According to some examples, both the linear polyphase filter and the nonlinear polyphase filter may be configured to resample the digital signal by a factor U/D, where U and D are positive integers, and where U>D. According to one example, U=5 and D=4.

According to some examples, the transmitter may be configured to process each digital signal of the set independently by applying a different pair of linear and nonlinear polyphase filters to each respective digital signal of the set, where each different pair is configured to pre-compensate for a linear transfer function and nonlinear noise associated with a different electro-optic path.

According to some examples, the constellation point may belong to a DP QPSK constellation, a DP 16-QAM constellation, or a DP 64-QAM constellation.

Figure 12:
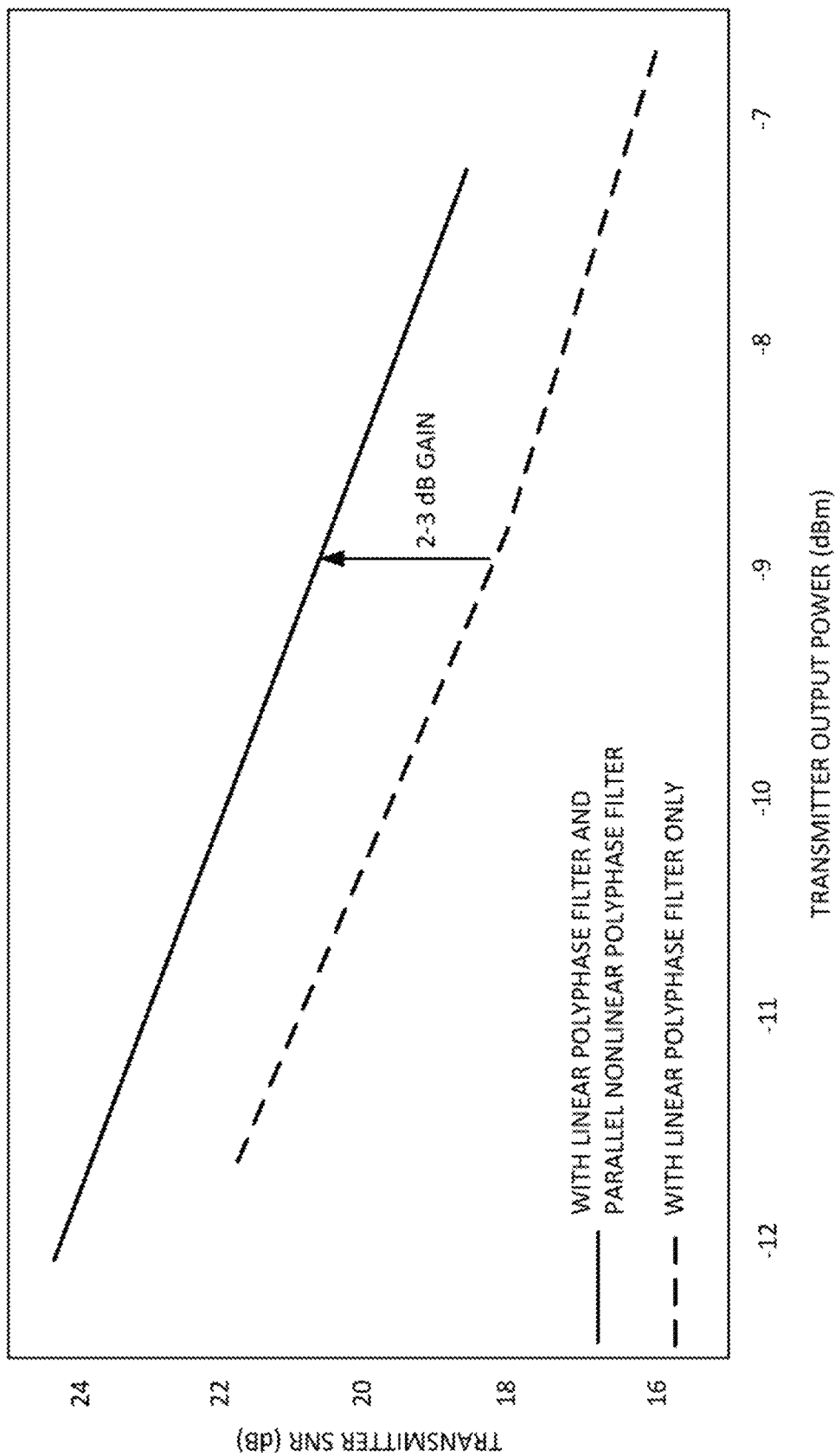
FIG. 12 illustrates a plot showing performance improvement achievable using a nonlinear polyphase filter in parallel with a linear polyphase filter in accordance with some examples of the technology disclosed herein.

FIG. 12 illustrates a plot showing an example of the performance improvement achievable by using a nonlinear polyphase filter in parallel with a linear polyphase filter. The transmitter SNR in dB is plotted as a function of the transmitter output power in dBm under two different conditions: the dashed line represents pre-compensation of linear effects using only a linear polyphase filter, while the solid line represents pre-compensation of linear and nonlinear effects using a linear polyphase filter in parallel with a nonlinear polyphase filter. For both lines, as the transmitter output power is increased by increasing the gain of the RF driver amplifier, there is an increase in the implementation noise of the transmitter, which results in a decrease in the transmitter SNR. However, a comparison of the two lines demonstrates that it may be possible to achieve a gain in SNR of approximately 2 to 3 dB when the nonlinear polyphase filter is used to pre-compensate for the nonlinear noise and distortion in the electro-optic path.

According to some examples, a power dissipation metric may be used to optimize the filters 502 and 504 to balance ASIC power dissipation with implementation noise. For example, the firmware tap coefficients of both filters 502 and 504 may be set to contain an arbitrary number of zeros, which would reduce heat and ASIC power dissipation at some acceptable level of implementation noise.

The scope of the claims should not be limited by the details set forth in the examples, but should be given the broadest interpretation consistent with the description as a whole.

What is claimed is:

1. A transmitter apparatus comprising:
   circuitry configured to generate a set of digital signals representative of a constellation point, each dimension of the constellation point being uniquely represented by m bits, wherein m∈{1, 2, 3};
   circuitry configured to apply a linear polyphase filter to a digital signal of the set, the linear polyphase filter configured to pre-compensate for a linear transfer function of an electro-optic path of the digital signal and to generate a first filtered signal having a roll-off factor α, wherein a is a positive real number satisfying α≤1;
   circuitry configured to apply a nonlinear polyphase filter to the digital signal, in parallel to applying the linear polyphase filter to the digital signal, the nonlinear polyphase filter configured to generate a second filtered signal representative of nonlinear noise in the electro-optic path;
   circuitry configured to calculate a pre-compensated digital signal from a difference between the first filtered signal and the second filtered signal; and
   a communication interface configured to transmit an optical signal based on the pre-compensated digital signal.

2. The transmitter apparatus as claimed in claim 1, wherein applying the nonlinear polyphase filter to the digital signal comprises applying a nonlinear function to a plurality of delayed versions of the digital signal associated with a respective plurality of different time indices.

3. The transmitter apparatus as claimed in claim 2, wherein the second filtered signal comprises a plurality of sub-streams corresponding to a respective plurality of different phases of the second filtered signal, wherein a selected phase of the second filtered signal is generated by selected filter coefficients of the nonlinear polyphase filter and selected time indices of the plurality of different time indices, and wherein the selected filter coefficients or the selected time indices or both are dependent on the selected phase.

4. The transmitter apparatus as claimed in claim 2, wherein applying the nonlinear function to the plurality of delayed versions of the digital signal comprises quantizing each delayed version using a memoryless quantizer.

5. The transmitter apparatus as claimed in claim 4, wherein quantizing each delayed version comprises selecting a single bit value based on a comparison between a magnitude of the delayed version and a threshold.

6. The transmitter apparatus as claimed in claim 1, wherein applying the nonlinear polyphase filter to the digital signal comprises performing only addition operations and no multiplication operations.

7. The transmitter apparatus as claimed in claim 1, wherein the linear polyphase filter and the nonlinear polyphase filter are configured to resample the digital signal by a factor U/D, wherein U and D are positive integers, and wherein U>D.

8. The transmitter apparatus as claimed in claim 1, further comprising
   circuitry configured to process each digital signal of the set independently by applying a different pair of linear and nonlinear polyphase filters to each respective digital signal of the set,
   wherein each different pair is configured to pre-compensate for a linear transfer function and nonlinear noise associated with a different electro-optic path.

9. The transmitter apparatus as claimed in claim 1, wherein the constellation point belongs to a dual-polarization (DP) quadrature phase shift keying (QPSK) constellation, a 16-level DP quadrature amplitude modulation (QAM) constellation, or a 64-level DP quadrature amplitude modulation (QAM) constellation.

10. The transmitter apparatus as claimed in claim 1, further comprising
circuitry configured to select the constellation point based on a probabilistic shaping function.

11. A method comprising:
generating a set of digital signals representative of a constellation point, each dimension of the constellation point being uniquely represented by m bits, wherein m∈{1, 2, 3};
applying a linear polyphase filter to a digital signal of the set, the linear polyphase filter configured to pre-compensate for a linear transfer function of an electro-optic path of the digital signal and to generate a first filtered signal having a roll-off factor α, wherein a is a positive real number satisfying α≤1;
applying a nonlinear polyphase filter to the digital signal, in parallel to applying the linear polyphase filter to the digital signal, the nonlinear polyphase filter configured to generate a second filtered signal representative of nonlinear noise in the electro-optic path;
calculating a pre-compensated digital signal from a difference between the first filtered signal and the second filtered signal; and
transmitting an optical signal based on the pre-compensated digital signal.

12. The method as claimed in claim 11, wherein applying the nonlinear polyphase filter to the digital signal comprises applying a nonlinear function to a plurality of delayed versions of the digital signal associated with a respective plurality of different time indices.

13. The method as claimed in claim 12, wherein the second filtered signal comprises a plurality of sub-streams corresponding to a respective plurality of different phases of the second filtered signal, wherein a selected phase of the second filtered signal is generated by selected filter coefficients of the nonlinear polyphase filter and selected time indices of the plurality of different time indices, and wherein the selected filter coefficients or the selected time indices or both are dependent on the selected phase.

14. The method as claimed in claim 12, wherein applying the nonlinear function to the plurality of delayed versions of the digital signal comprises quantizing each delayed version using a memoryless quantizer.

15. The method as claimed in claim 14, wherein quantizing each delayed version comprises selecting a single bit value based on a comparison between a magnitude of the delayed version and a threshold.

16. The method as claimed in claim 11, wherein applying the nonlinear polyphase filter to the digital signal comprises performing only addition operations and no multiplication operations.

17. The method as claimed in claim 11, wherein the linear polyphase filter and the nonlinear polyphase filter are configured to resample the digital signal by a factor U/D, wherein U and D are positive integers, and wherein U>D.

18. The method as claimed in claim 11, further comprising processing each digital signal of the set independently by applying a different pair of linear and nonlinear polyphase filters to each respective digital signal of the set, wherein each different pair is configured to pre-compensate for a linear transfer function and nonlinear noise associated with a different electro-optic path.

19. The method as claimed in claim 11, wherein the constellation point belongs to a dual-polarization (DP) quadrature phase shift keying (QPSK) constellation, a 16-level DP quadrature amplitude modulation (QAM) constellation, or a 64-level DP quadrature amplitude modulation (QAM) constellation.

20. The method as claimed in claim 11, further comprising selecting the constellation point based on a probabilistic shaping function.

* * * * *

UNITED STATES PATENT AND TRADEMARK OFFICE
CERTIFICATE OF CORRECTION

PATENT NO. : 11,336,367 B1
APPLICATION NO. : 17/460437
DATED : May 17, 2022
INVENTOR(S) : Shahab Oveis Gharan et al.

It is certified that error appears in the above-identified patent and that said Letters Patent is hereby corrected as shown below:

On the Title Page

(73) Assignee should read:
CIENA CORPORATION, Hanover, MD (US)

In the Claims

Line 11 of Claim 1 should read:
wherein $\alpha$ is a positive real number satisfying $\alpha \leq 1$;

Lines 10-11 of Claim 11 should read:
signal having a roll-off factor $\alpha$, wherein $\alpha$ is a positive real number satisfying $\alpha \leq 1$;

Signed and Sealed this
Fourteenth Day of June, 2022

Katherine Kelly Vidal
*Director of the United States Patent and Trademark Office*